(12) United States Patent
Mateer (10) Patent No.: US 9,659,336 B2
(45) Date of Patent: May 23, 2017

(54) MOBILE BAGGAGE DISPATCH SYSTEM AND METHOD

(75) Inventor: Craig Mateer, Orlando, FL (US)

(73) Assignee: BAGS, INC., Orlando, FL (US)

( * ) Notice: Subject to any disclaimer, the term of this patent is extended or adjusted under 35 U.S.C. 154(b) by 0 days.

(21) Appl. No.: 13/443,640

(22) Filed: Apr. 10, 2012

(65) Prior Publication Data

US 2013/0268454 A1   Oct. 10, 2013

(51) Int. Cl.
*G06Q 50/28* (2012.01)
*G06Q 10/08* (2012.01)

(52) U.S. Cl.
CPC ............ *G06Q 50/28* (2013.01); *G06Q 10/08* (2013.01); *G06Q 10/083* (2013.01)

(58) Field of Classification Search
CPC ................................................. G06Q 10/0833
USPC ........ 705/333, 26.62; 340/539.13; 455/422.1
See application file for complete search history.

(56) References Cited

U.S. PATENT DOCUMENTS

| | | | |
|---|---|---|---|
| 4,711,994 A | 12/1987 | Greenberg | |
| 4,984,156 A | 1/1991 | Mekata | |
| 5,322,473 A | 6/1994 | Hofstra et al. | |
| 5,401,944 A | 3/1995 | Bravman et al. | |
| 5,793,639 A | 8/1998 | Yamazaki | |
| 5,835,376 A | 11/1998 | Smith et al. | |
| 5,866,888 A * | 2/1999 | Bravman et al. | 235/375 |
| 5,914,671 A | 6/1999 | Tuttle | |
| 6,044,353 A | 3/2000 | Pugliese, III | |
| 6,119,096 A | 9/2000 | Mann et al. | |
| 6,127,917 A | 10/2000 | Tuttle | |
| 6,430,496 B1 | 8/2002 | Smith et al. | |
| 6,509,829 B1 | 1/2003 | Tuttle | |
| 6,512,964 B1 | 1/2003 | Quackenbush et al. | |
| 6,542,081 B2 | 4/2003 | Torch | |
| 6,544,173 B2 | 4/2003 | West et al. | |
| 6,544,174 B2 | 4/2003 | West et al. | |
| 6,594,547 B2 | 7/2003 | Manabe et al. | |
| 6,616,606 B1 | 9/2003 | Petersen et al. | |
| 6,662,078 B1 | 12/2003 | Hardgrave et al. | |
| 6,694,248 B2 | 2/2004 | Smith et al. | |
| 6,696,954 B2 | 2/2004 | Chung | |
| 6,703,935 B1 | 3/2004 | Chung et al. | |
| 6,711,463 B2 | 3/2004 | Tozuka et al. | |
| 6,720,874 B2 | 4/2004 | Fufido et al. | |
| 6,807,458 B2 | 10/2004 | Quackenbush et al. | |
| 6,816,762 B2 | 11/2004 | Hensey et al. | |
| 6,845,293 B1 * | 1/2005 | Ananda | 700/226 |

(Continued)

OTHER PUBLICATIONS

Airportbags Plus News Archives, "Welcome to Plus", Sep. 12, 2012 (17 pages).

(Continued)

*Primary Examiner* — Akiba Allen
(74) *Attorney, Agent, or Firm* — Terry M. Sanks, Esq.; Beusse Wolter Sanks & Maire, PLLC (57) ABSTRACT

The disclosure relates to an apparatus, method and system for dispatching baggage. The apparatus includes a processor configured to receive baggage information associated with a passenger; associate the baggage information with a delivery person, where the delivery person is associated with delivery person information; and transmit at least apportion of the baggage information and the delivery person information to a passenger computing device associated with the passenger.

20 Claims, 9 Drawing Sheets

(56) References Cited

U.S. PATENT DOCUMENTS

| | | |
|---|---|---|
| 6,870,477 B2 | 3/2005 | Gruteser et al. |
| 6,892,066 B2 | 5/2005 | Detweiler et al. |
| 6,943,688 B2 | 9/2005 | Chung et al. |
| 6,960,715 B2 | 11/2005 | Riopelle |
| 6,988,989 B2 | 1/2006 | Weiner et al. |
| 6,990,491 B2 | 1/2006 | Dutta et al. |
| 7,027,773 B1 | 4/2006 | McMillin |
| 7,030,732 B2 | 4/2006 | Tuttle |
| 7,040,541 B2 | 5/2006 | Swartz et al. |
| 7,044,371 B2 * | 5/2006 | Dove et al. ................ 235/384 |
| 7,079,921 B2 | 7/2006 | Quackenbush et al. |
| 7,096,089 B2 | 8/2006 | Quackenbush et al. |
| 7,113,864 B2 | 9/2006 | Smith et al. |
| 7,117,121 B2 | 10/2006 | Brinton et al. |
| 7,149,533 B2 | 12/2006 | Laird et al. |
| 7,221,928 B2 | 5/2007 | Laird et al. |
| 7,319,321 B2 | 1/2008 | Murray et al. |
| 7,327,262 B2 | 2/2008 | Motteram et al. |
| 7,327,268 B2 | 2/2008 | Gruteser et al. |
| 7,343,243 B2 | 3/2008 | Smith et al. |
| 7,376,623 B2 | 5/2008 | Dutta et al. |
| 7,378,975 B1 | 5/2008 | Smith et al. |
| 7,390,299 B2 | 6/2008 | Weiner et al. |
| 7,403,844 B2 | 7/2008 | Chopcinski et al. |
| 7,439,694 B2 | 10/2008 | Atlas et al. |
| 7,447,562 B2 | 11/2008 | Quackenbush et al. |
| 7,477,153 B2 | 1/2009 | Gruteser et al. |
| 7,480,622 B2 | 1/2009 | Dutta et al. |
| 7,488,294 B2 | 2/2009 | Torch |
| 7,523,385 B2 | 4/2009 | Nguyen et al. |
| 7,570,151 B2 | 8/2009 | Tuttle |
| 7,573,257 B2 | 8/2009 | Li et al. |
| 7,599,847 B2 | 10/2009 | Block et al. |
| 7,653,394 B2 | 1/2010 | McMillin |
| 7,658,247 B2 | 2/2010 | Carter |
| 7,840,427 B2 | 11/2010 | O'Sullivan |
| 7,890,358 B2 | 2/2011 | Dutta et al. |
| 7,978,066 B2 | 7/2011 | Lim et al. |
| 8,046,160 B2 | 10/2011 | Carter et al. |
| 8,571,902 B1 | 10/2013 | Glavan et al. |
| 2001/0034623 A1 | 10/2001 | Chung |
| 2002/0095318 A1 | 7/2002 | Parry |
| 2003/0055689 A1 | 3/2003 | Block et al. |
| 2003/0061085 A1 | 3/2003 | Lanigan, Sr. |
| 2003/0189094 A1 | 10/2003 | Trabitz |
| 2004/0035928 A1 | 2/2004 | Anderson |
| 2004/0056779 A1 | 3/2004 | Rast |
| 2004/0066273 A1 | 4/2004 | Cortina et al. |
| 2004/0117278 A1 | 6/2004 | Dutta et al. |
| 2004/0181570 A1 * | 9/2004 | Kaneko ................ 709/200 |
| 2004/0220845 A1 * | 11/2004 | Malapitan ................ 705/8 |
| 2004/0250076 A1 | 12/2004 | Kung |
| 2005/0083171 A1 | 4/2005 | Hamilton |
| 2005/0096946 A1 | 5/2005 | Janakiraman et al. |
| 2005/0159838 A1 | 7/2005 | Quackenbush et al. |
| 2005/0197848 A1 | 9/2005 | Chou et al. |
| 2005/0212657 A1 | 9/2005 | Simon |
| 2005/0251430 A1 | 11/2005 | Jindel |
| 2005/0258231 A1 | 11/2005 | Wiater |
| 2005/0269404 A1 | 12/2005 | Landwirth et al. |
| 2006/0026871 A1 | 2/2006 | Alexander et al. |
| 2006/0032417 A1 | 2/2006 | Goschy et al. |
| 2006/0145852 A1 | 7/2006 | McElhannon et al. |
| 2006/0197523 A1 | 9/2006 | Palecki et al. |
| 2006/0235739 A1 * | 10/2006 | Levis et al. ................ 705/9 |
| 2006/0249320 A1 | 11/2006 | Carter et al. |
| 2006/0271552 A1 | 11/2006 | McChesney et al. |
| 2007/0038476 A1 | 2/2007 | Sternlicht |
| 2007/0176739 A1 | 8/2007 | Raheman |
| 2007/0203765 A1 * | 8/2007 | Schoen et al. ................ 705/6 |
| 2007/0273611 A1 | 11/2007 | Torch |
| 2007/0290848 A1 | 12/2007 | Tuttle |
| 2007/0290849 A1 | 12/2007 | Tuttle |
| 2007/0290879 A1 | 12/2007 | Tuttle |
| 2008/0041282 A1 | 2/2008 | Goschy et al. |
| 2008/0046298 A1 | 2/2008 | Ben-Yehuda et al. |
| 2008/0070771 A1 * | 3/2008 | Campbell, Jr. ................ 493/186 |
| 2008/0228562 A1 | 9/2008 | Smith et al. |
| 2009/0066476 A1 | 3/2009 | Raheman |
| 2009/0115572 A1 * | 5/2009 | Valbh et al. ................ 340/7.58 |
| 2009/0164261 A1 | 6/2009 | Mateer |
| 2010/0156606 A1 | 6/2010 | Gold |
| 2010/0205105 A1 * | 8/2010 | Robertson et al. ........... 705/334 |
| 2010/0223245 A1 | 9/2010 | Vermilye |
| 2010/0318783 A1 | 12/2010 | Raj et al. |
| 2012/0030133 A1 | 2/2012 | Rademaker |

OTHER PUBLICATIONS

Cisco Systems, White Paper, "Wi-Fi Based Real-Time Location Tracking: Solutions and Technology," 2006, (6 pages).

Concourse Communications Group, LLC, "The WiFi-enabled Airport," 2004, (4 pages).

Cox, John, "RFID, Radio Location Service Use Soaring at Hospitals," PC World website, Aug. 20, 2008 (printed Oct. 12, 2012), http://www.pcworld.com/article/150075/rfid_in_hospitals.html, (3 pages).

IBSS Press Release, "IBSS and Prospect Airport Services' PDS Express Improves Efficiency While Increasing the Customer Satisfaction of Airline Travelers in Detroit Metropolitan Airport: Greatly Improved Passenger Service Is Enjoyed by 'Special Needs' Travelers Being Serviced Each Day. First Year's Success in Detroit Leads to Multi-Site Expansion," (printed Oct. 12, 2012), http://www.ibss.net/cgi-bin/news?20050308, (2 pages).

IBSS Press Release, "IBSS and Prospect Airport Services' PDS Express Selected by America West Airlines for Las Vegas, McCarran International Airport: The Nation's Second Largest Low-Cost Carriers 'Special Needs' Travelers to Enjoy Improved Passenger Service Via Synapse™-Based System," (printed Oct. 12, 2012), http://www.ibss.net/cgi-bin/news?20050719, (1 page).

IBSS Press Release, "IBSS Introduces SynTrack™ Mobile Dispatch and Transport for Healthcare. Showcased at AHRMM Technology Conference, System Empowers Hospitals to Increase Efficiency and Patient Throughput While Improving the Quality of Patient Care," (printed Oct. 12, 2012), http://www.ibss.net/cgi-bin/news?200603211, (2 pages).

USAToday.com, "Las Vegas airport offering free Wi-Fi Internet Connections," Posted Jan. 4, 2005 (printed Oct. 12, 2012), http://usatoday30.usatoday.com/tech/wireless/data/2005-01-04-vegas-wi-fi_x.htm, (2 pages).

International Search Report and Written Opinion issued in Application No. PCT/US13/35765 mailed Aug. 26, 2013 (6 pages).

Driscoll, Louise, "Remote Check-in-driving NewTrends," Jun. 2009.

Taylor, "Hotel Min-Bars Provide Instant Room Service," Sep. 20, 1987 Los Angeles Times.

Weisel, "How Secure is Your Hotel Safe," Mar. 1999 Travel and Leisure Magazine.

Trip Advisor, McCaran Airport Hotel Check-in Service (MGM) Jun. 28, 2008.

Business Wire, "National Airlines Introduces National Flight Centers and Adds a Third New York, JFK Flight," May 6, 1999.

Certifed Airline Passenger Services, "CAPS of Las Vegas Selects Unisys to Move Check-in Out of the Airport," Business Wire, Inc., Jun. 28, 2000.

Certified Airline Passenger Services, "Facsimile" Oct. 16, 2003.

Gibson, Stan, "Cleared for takeoff: National Airlines Outsources IT for Lean and Mean Flight Operations Fueled by Web Techology," Company Business and Marketing, PC Week, No. 20, vol. 16, p. 87, May 17, 1999.

Gould, Lark Ellen, "Raising the Stakes," Travel Agent, No. 10, vol. 294, p. 100, Apr. 12, 1999.

Smith, Hubble, "Airline Passenger Service Has Lofty Expansion Goals," Las Vegas Review Journal, Jun. 22, 2001.

Golf Bag Shipping, "Golf Bag Shipping Delivers Your Golf Clubs" Aug. 2000.

LA Times, "News, Tips & Bargains; A Seamless Takeoff—From Your Room," Part L, p. 3, Sunday Home Edition, Oct. 10, 1999.

(56) References Cited

OTHER PUBLICATIONS

PR Newswire, "America West Offers Baggage Check-In Service at Imperial Palace," Jun. 21, 1999.
Purnell et al., Design and Development Airport Security Systems and Related Applications, Baggage Direct, Apr. 24, 2001.
Florida Department of Transportation, "Scope of Services for Off-Line Baggage Processing," Dec. 9, 2002.
Velotta, Richard N., "CAPS Outlines Growth Plans at Conference," Las Vegas Sun, Jun. 27, 2001.
Scientific and Technical Information Center, Case Study: Dublin Airport, Airports International, Apr. 2001, C. 34, N. 3, p. 26.

* cited by examiner

MOBILE BAGGAGE DISPATCH SYSTEM AND METHOD

BACKGROUND

The present disclosure relates generally to the field of baggage management. In particular, the present disclosure relates to a system and a method of coordinating and monitoring baggage delivery.

When baggage is lost during an airline flight, a passenger usually reports the bag missing and leaves an address and phone number where the baggage can be dropped off. The passenger continues to his destination, for example, to a hotel, his home, or a resort, without his baggage. The airline or airport then commences a search for the baggage, for example, by parsing unclaimed baggage in the system. After the baggage is located by the airline or airport, the airline can then deliver the baggage to the passenger. It can be a number of days before baggage is located and forwarded to the correct destination. Typically, the baggage is actually delivered to the passenger by a sub-contractor, such as a taxi service.

Often, the sub-contractor will call the passenger at the address to confirm the drop-off location, to determine if the passenger is home, and to let the passenger know that the baggage will be dropped off. A typical sub-contractor will drop the baggage off at the front door, ring the doorbell, and leave; where the baggage could then be stolen. Further, the sub-contractor could simply keep the baggage and merely report the baggage as delivered. Thus, improved systems and methods for coordinating and monitoring baggage delivery are needed.

SUMMARY

One embodiment relates to an apparatus for dispatching baggage. The apparatus includes a processor configured to receive baggage information associated with a passenger; associate the baggage information with a delivery person, where the delivery person is associated with delivery person information; and transmit at least apportion of the baggage information and the delivery person information to a passenger computing device associated with the passenger.

Another embodiment relates to a method of dispatching baggage including receiving baggage information associated with a passenger; associating the baggage information with a delivery person, wherein the delivery person is associated with delivery person information; and transmitting at least a portion of the baggage information and the delivery person information to a passenger computing device associated with the passenger.

Another embodiment relates to a non-transitory computer-readable storage medium having instructions stored thereon that, if executed by a computing device, cause the computing device to perform operations including receiving baggage information associated with a passenger; associating the baggage information with a delivery person, wherein the delivery person is associated with delivery person information; and transmitting at least a portion of the baggage information and the delivery person information to a passenger computing device associated with the passenger.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF THE ILLUSTRATIVE EMBODIMENTS

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Figure 1:
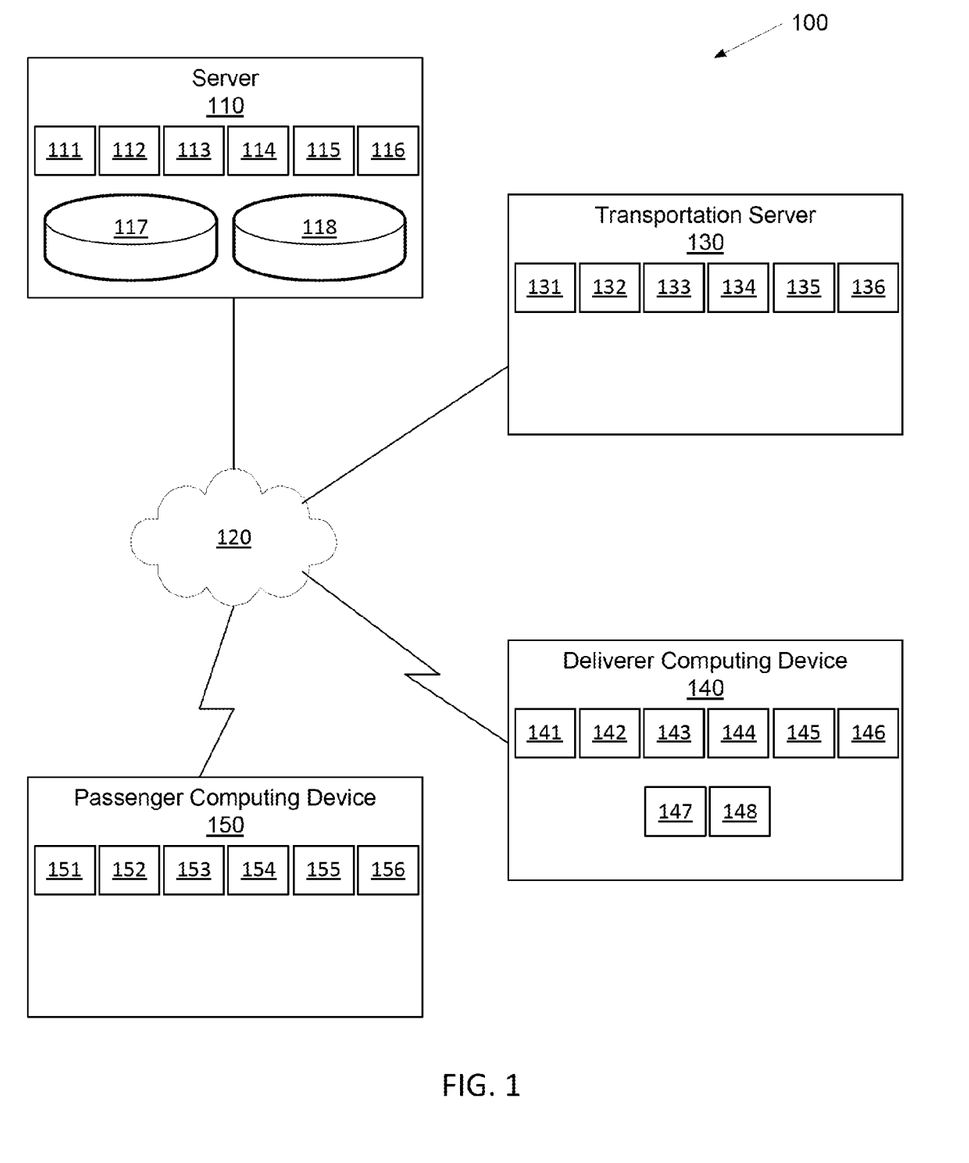
FIG. 1 is a schematic of a mobile baggage dispatch system in accordance with an illustrative embodiment.

The present disclosure is directed to a mobile baggage dispatch system, method, and computer-readable medium. Referring to FIG. 1, a schematic of a mobile baggage dispatch system 100 in accordance with an illustrative embodiment is shown. The mobile baggage dispatch system 100 can include a server 110, a transportation server 130, a deliverer computing device 140, and a passenger computing device 150. The server 110, the transportation server 130, the deliverer computing device 140, and the passenger computing device 150 can be communicatively coupled via network 120. The network 120 can be the Internet, an Ethernet, a Wi-Fi network, a wired or wireless phone network, a dedicated line, a wireless connection, or any other network.

The server 110 can be a personal computer or any other computer. A user can interface with the server 110 via a terminal or a computing device communicatively coupled to server 110. For example, the server 110 can serve a webpage to the deliverer computing device 140 or the passenger computing device 150, which enables a user to query information and submit commands. The webpage can be, for example, a hypertext markup language document. Alternatively, an application can be used to interface with the server 110.

The server 110 can receive baggage information, transmit baggage information, manage bag drop offs, and log bag drop offs. The server 110 can be a personal computer, a circuit, a cell phone, a smart phone, a tablet, a personal data assistant, or any other computing device. The server 110 can include one or more of, a processor 111, a memory 112, server software 113, a task database 117, a records database 118, a display 114, a user interface 115, and a transceiver 116. In alternative embodiments, the server 110 may include fewer, additional, and/or different components. The memory 112, which can be any type of permanent or removable computer memory known to those of skill in the art, can be a computer-readable storage medium. The memory 112 can be configured to store one or more of the server software 113, an application configured to run the server software 113, captured data, and/or other information and applications as known to those of skill in the art. The transceiver 116 of the server 110 can be used to receive and/or transmit information through a wired or wireless network as known to those of skill in the art. The transceiver 116, which can include a receiver and/or a transmitter, can be a modem or other communication component known to those of skill in the art. The baggage information can be stored in the records database 118. Information associated with the bag drop offs can be stored in the task database 117.

The server software 113 can be configured to receive baggage information, transmit baggage information, manage bag drop offs, and log bag drop offs. For example, the server software 113 can maintain information associated with bags waiting for delivery and information associated with bags that have been delivered. In one embodiment, the server software 113 can include a computer program (for example, script query language (SQL), PHP, Python, html code, an applet, and/or a script) and/or an application configured to execute the program (for example, Microsoft™ Access, Oracle™ Database, Microsoft Internet Explorer™ or Google Chrome™). Alternatively, other programming languages and/or applications known to those of skill in the art can be used. In one embodiment, the server software 113 can be a dedicated standalone application. The processor 111, which can be in electrical communication with each of the components of the server 110, can be used to run the application and to execute the instructions of the server software 113. Any type of computer processor(s) known to those of skill in the art may be used.

The transportation server 130 can provide baggage information to the server 110 and vice versa. For example, the baggage information can include information describing bags that need to be delivered, bags that have been picked up from a terminal, and bags that have been delivered. The transportation server 130 can be associated with an airport, a rail terminal, a hotel, or any other organization or place that can be associated with baggage, missing baggage or packages. The transportation server 130 can be a personal computer, a circuit, a cell phone, a smart phone, a tablet, a personal data assistant, or any other computing device. The transportation server 130 can include one or more of, a processor 131, a memory 132, transportation server software 133, a display 134, a user interface 135, and a transceiver 136. In alternative embodiments, the transportation server 130 may include fewer, additional, and/or different components. The memory 132, which can be any type of permanent or removable computer memory known to those of skill in the art, can be a computer-readable storage medium. The memory 132 can be configured to store one or more of the transportation server software 133, an application configured to run the transportation server software 133, captured data, and/or other information and applications as known to those of skill in the art. The transceiver 136 of the transportation server 130 can be used to receive and/or transmit information through a wired or wireless network as known to those of skill in the art. The transceiver 136, which can include a receiver and/or a transmitter, can be a modem or other communication component known to those of skill in the art.

The transportation server software 133 can be configured to notify the server 110 of needed bag drop offs and receive indications of completed bag drop offs. For example, the transportation server software 133 can maintain information associated with bags waiting for delivery and information associated with bags that have been delivered. In one embodiment, the transportation server software 133 can include a computer program (for example, script query language (SQL), PHP, Python, html code, an applet, and/or a script) and/or an application configured to execute the program (for example, ARNIC MUSE™, Microsoft™ Access, Oracle™ Database, Microsoft Internet Explorer™ or Google Chrome™). Alternatively, other programming languages and/or applications known to those of skill in the art can be used. In one embodiment, the transportation server software 133 can be a dedicated standalone application. The processor 131, which can be in electrical communication with each of the components of the transportation server 130, can be used to run the application and to execute the instructions of the transportation server software 133. Any type of computer processor(s) known to those of skill in the art may be used.

The deliverer computing device 140 can receive and transmit baggage information to enable delivery personnel. For example, the baggage information can include information describing bags that need to be picked up from a terminal, bags that need to be delivered, and a record of bags that have been delivered. The deliverer computing device 140 can be associated with a delivery person such as a subcontractor. The deliverer computing device 140 can be a cell phone, a smart phone, a tablet, a personal data assistant, a personal computer, a circuit, or any other computing device. The deliverer computing device 140 can include one or more of, a processor 141, a memory 142, transportation server software 143, a display 144, a user interface 145, a transceiver 146, a scanner 147, and a global positioning system (GPS) device 148. In alternative embodiments, the deliverer computing device 140 may include fewer, additional, and/or different components. The memory 142, which can be any type of permanent or removable computer memory known to those of skill in the art, can be a computer-readable storage medium. The memory 142 can be configured to store one or more of the delivery software 143, an application configured to run the delivery software 143, captured data, and/or other information and applications as known to those of skill in the art. The transceiver 146 of the deliverer computing device 140 can be used to receive and/or transmit information through a wired or wireless network as known to those of skill in the art. The transceiver, which can include a receiver and/or a transmitter, can be a modem or other communication component known to those of skill in the art.

The delivery software 143 can be configured to notify the server 110 of completed bag drop offs and to receive bag drop off information from the server 110 and/or passenger computing device 150. For example, the delivery software 143 can collect information associated with bags that a delivery person has picked up and information regarding the location of the deliverer computing device 140 at an indicated delivery time. In one embodiment, the delivery software 143 can include a computer program (for example, script query language (SQL), PHP, Python, html code, an applet, and/or a script) and/or an application configured to execute the program (for example, Microsoft™ Access, Oracle™ Database, Microsoft Internet Explorer™ or Google Chrome™). Alternatively, other programming languages and/or applications known to those of skill in the art can be used. In one embodiment, the delivery software 143 can be a dedicated standalone application. The processor 141, which can be in electrical communication with each of the components of the deliverer computing device 140, can be used to run the application and to execute the instructions of the delivery software 143. Any type of computer processor(s) known to those of skill in the art may be used.

The passenger computing device 150 can receive and transmit baggage information to enable a passenger to interact remotely with delivery personnel. For example, the baggage information can include information describing bags that need to be picked up from a terminal, bags that need to be delivered, and a record of bags that have been delivered. The passenger computing device 150 can be associated with a passenger associated with lost baggage. The passenger computing device 150 can be a cell phone, a smart phone, a tablet, a personal data assistant, a personal computer, a circuit, or any other computing device. The passenger computing device 150 can include one or more of, a processor 151, a memory 152, passenger software 153, a display 154, a user interface 155, and a transceiver 156. In alternative embodiments, the passenger computing device 150 may include fewer, additional, and/or different components. The memory 152, which can be any type of permanent or removable computer memory known to those of skill in the art, can be a computer-readable storage medium. The memory 152 can be configured to store one or more of the passenger server software 153, an application configured to run the passenger software 153, captured data, and/or other information and applications as known to those of skill in the art. The transceiver 156 of the passenger computing device 150 can be used to receive and/or transmit information through a wired or wireless network as known to those of skill in the art. The transceiver 156, which can include a receiver and/or a transmitter, can be a modem or other communication component known to those of skill in the art.

The passenger software 153 can be configured to transmit and receive bag drop off information to the server 110 and/or deliverer computing device 140. For example, the passenger software 153 can collect information associated with a bag drop off and submit it to server and display information associated with a bag drop off such as a proposed delivery time. In one embodiment, the passenger software 153 can include a computer program (for example, script query language (SQL), PHP, Python, html code, an applet, and/or a script) and/or an application configured to execute the program (for example, Microsoft™ Access, Oracle™ Database, Microsoft Internet Explorer™ or Google Chrome™). Alternatively, other programming languages and/or applications known to those of skill in the art can be used. In one embodiment, the passenger software 153 can be a dedicated standalone application. The processor 151, which can be in electrical communication with each of the components of the deliverer computing device 150, can be used to run the application and to execute the instructions of the passenger software 153. Any type of computer processor(s) known to those of skill in the art may be used.

Advantageously, the server 110, the transportation server 130, the deliverer computing device 140, and the passenger computing device 150 can communicate baggage information amongst each other to increase the efficiency of missing baggage delivery, enhance passenger experience, and provide a record of baggage delivery.

Figure 2:
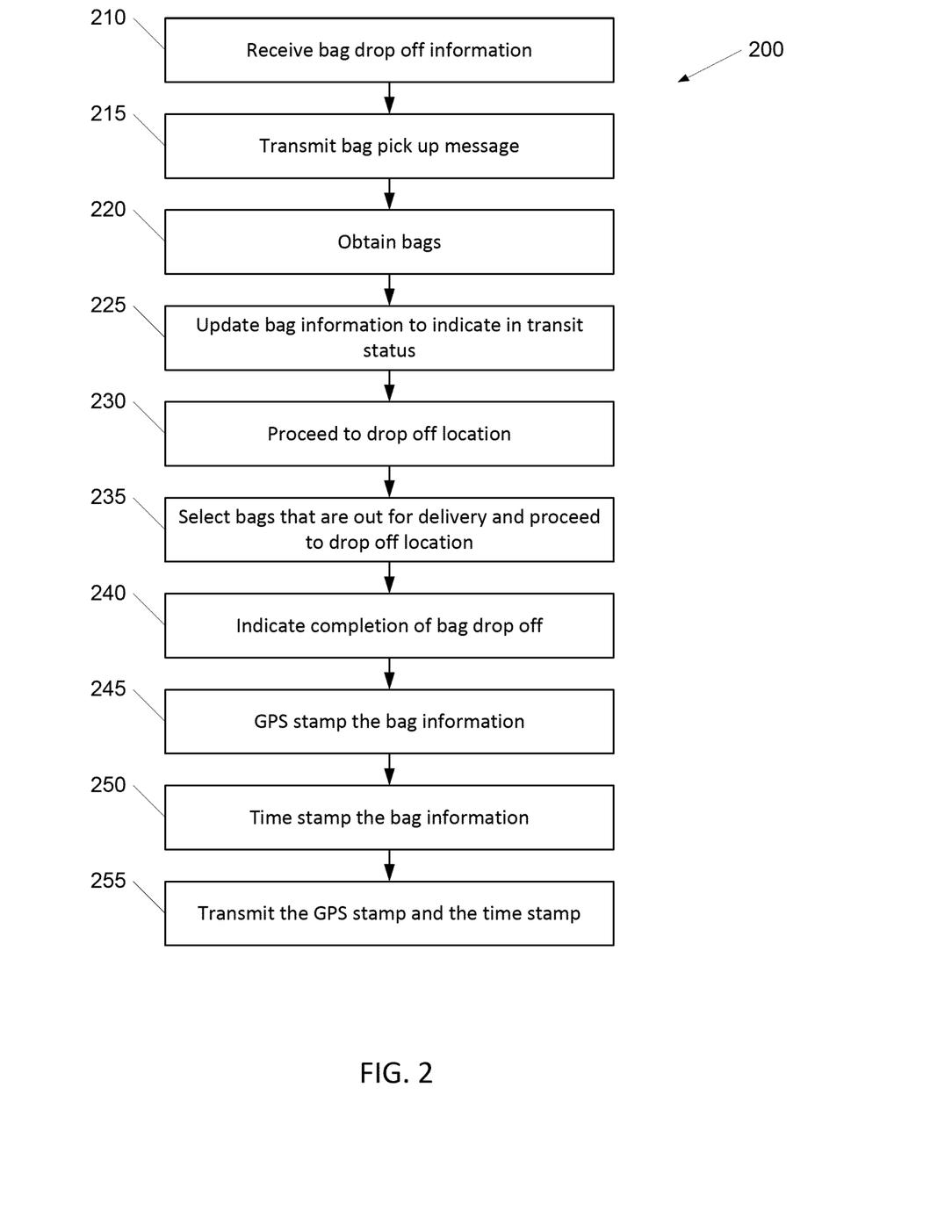
FIG. 2 is a flow diagram of a method of baggage delivery in accordance with an illustrative embodiment.

Referring now to FIG. 2, a flow diagram of a method of baggage delivery 200 in accordance with an illustrative embodiment is shown. Additional, fewer, or different operations may be performed depending on the particular implementation. The operations for baggage delivery 200 can be executed, for example, in least in part by a system for mobile baggage dispatch, such as the system described above.

In an operation 210, a server can receive information associated with needed bag drop offs from a transportation server. For example, the transportation server can send a list of bags that need to be dropped off to passengers. The list can include bag information such as a proposed drop off address, a passenger name, passenger contact information, a bag description, a current bag location, delivery status, and a tracking code.

In an operation 215, the server can transmit a pick up bags message to a deliverer computing device associated with a delivery person. The pick up bags message can include the proposed drop off address, the passenger name, the bag description, the current bag location, and the tracking code. The delivery person can proceed to the current bag location to obtain the bags that need to be dropped off.

In an operation 220, the delivery person can obtain the bags that need to be dropped off. The delivery person can enter information into the deliverer computing device indicating that the bags that need to be dropped off are now in the possession of the delivery person. The deliverer computing device can include delivery software as described above. In one embodiment, the deliverer computing device can include a scanner to scan the tracking code of the bags picked up by the delivery person.

In an operation 225, the delivery software can update the bag information and transmit the updated bag information to the server. The delivery software can update the bag information such as current bag location and delivery status. For example, the delivery status can be updated to "in transit." In another embodiment, the deliverer computing device can include an interface for the delivery person to indicate which bags he has picked up, as described below.

Figure 3:
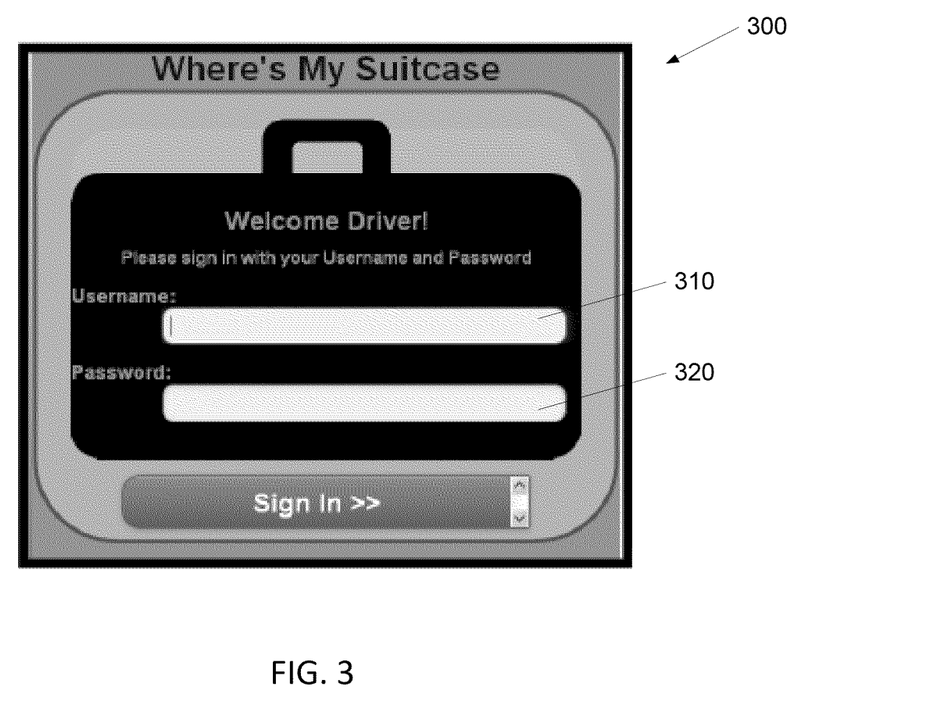
FIG. 3 is a diagram of a login interface of the delivery software in accordance with an illustrative embodiment.

FIG. 3 is a diagram of a login interface 300 of the delivery software in accordance with an illustrative embodiment. The delivery person can enter a username in the username text box 310 and a password in the password text box 320 in order to gain access to the delivery software.

Figure 4:
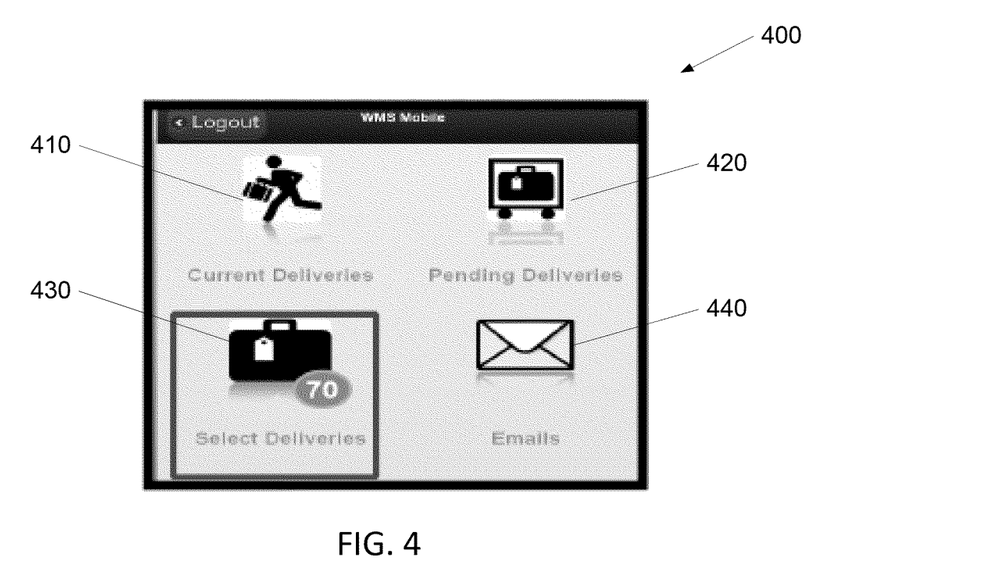
FIG. 4 is a diagram of a menu interface of the delivery software in accordance with an illustrative embodiment.

FIG. 4 is a diagram of a menu interface 400 of the delivery software in accordance with an illustrative embodiment. The delivery person can select one of a current deliveries component 410, a pending deliveries component 420, a select deliveries component 430, and an email component 440, described further below. For example, the delivery person can select the select deliveries component 430. FIG. 4 shows that the select deliveries component 430 has information regarding 70 bags that need to be dropped off.

Figure 5:
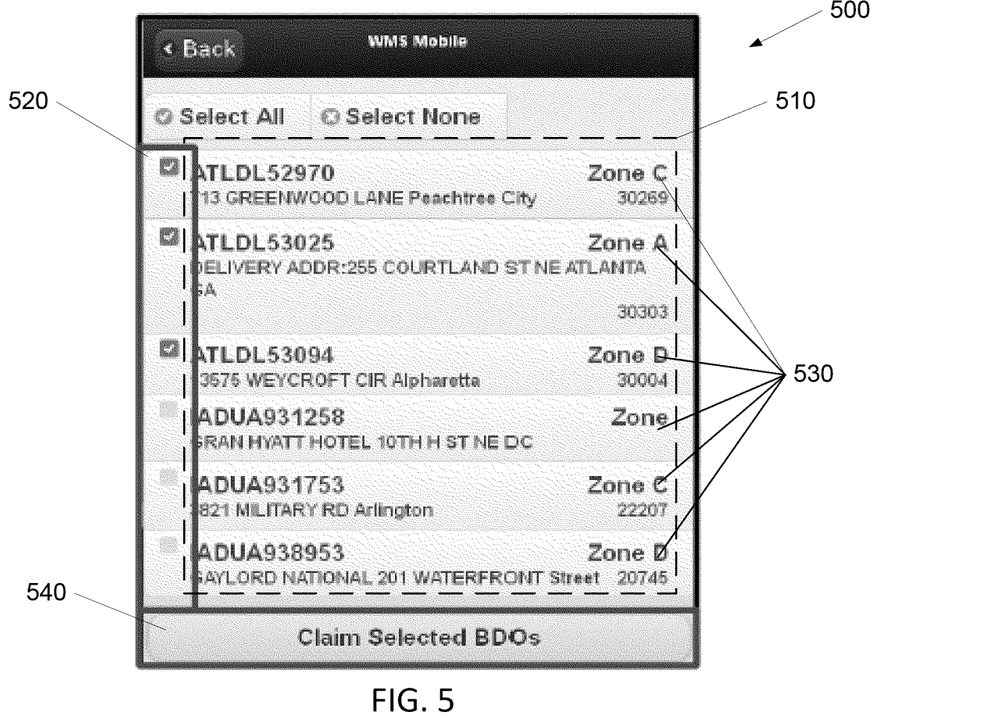
FIG. 5 is a diagram of a select deliveries interface of the delivery software in accordance with an illustrative embodiment.

FIG. 5 is a diagram of a select deliveries interface 500 of the delivery software in accordance with an illustrative embodiment. The select deliveries interface 500 can include a display 510 with a list of bag drop offs 530. The list of bag drop offs 530 can be received from the server. The list of bag drop offs 530 can include information describing the bags that need to be dropped off such as the proposed drop off address, the passenger name, the bag description, the current bag location, and the tracking code. Each bag in the list of bag drop offs 530 can be associated with a selection field 520. The delivery person can check the selection field 520 for each bag in the list of bag drop offs 530 that he picks up. In FIG. 5, the first three bags of the list of bag drop offs 530 are selected. The list of bag drop offs 530 can also include zone information 530. For example, the delivery person may be assigned a certain zone or zones, such as "Zone A." The delivery person would pick up all bags labeled "Zone A." After the delivery person has selected the desired bag(s), he can select a claim button 540, which indicates his receipt of the selected bags from the list of bag drop offs 530. The claimed bag(s) the delivery person has selected can be classified as pending deliveries. The deliverer computing device can transmit information to the server describing the pending deliveries, i.e., the desired bag(s) the delivery person has selected and claimed. Alternatively, a dispatcher can assign bags for the delivery person to take. In one embodiment, the list of bag drop offs 530 can be limited to bags assigned by the dispatcher.

Figure 6:
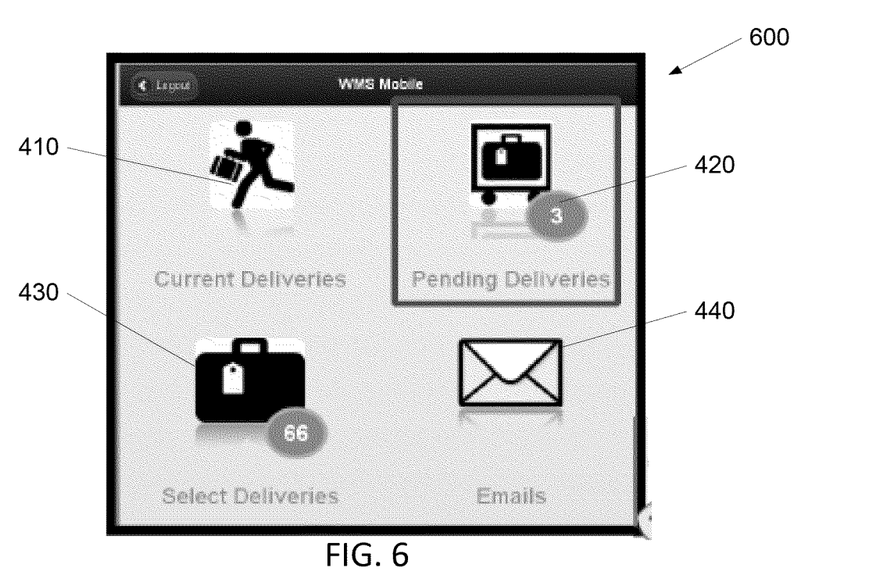
FIG. 6 is a diagram of the menu interface of FIG. 4 with pending deliveries of the delivery software in accordance with an illustrative embodiment.

FIG. 6 is a diagram of the menu interface of FIG. 4 with pending deliveries 600 of the delivery software in accordance with an illustrative embodiment. After the delivery person has selected and claimed the desired bag(s), the pending deliveries component 420 can indicate the number of pending deliveries. FIG. 6 shows that there are three pending deliveries.

Figure 7:
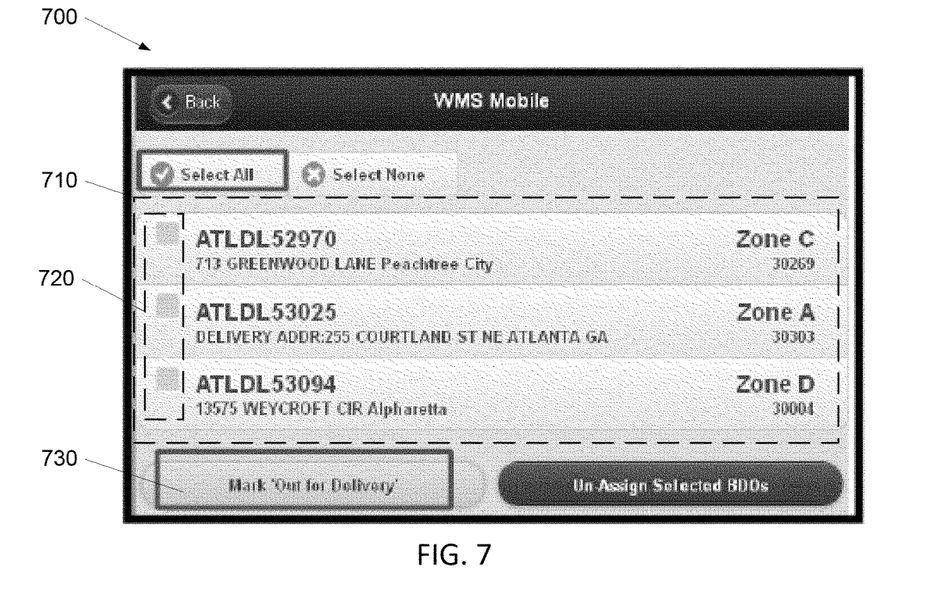
FIG. 7 is a diagram of a pending deliveries interface of the delivery software in accordance with an illustrative embodiment.

FIG. 7 is a diagram of a pending deliveries interface 700 of the delivery software in accordance with an illustrative embodiment. The pending deliveries interface 700 can include a list of pending bag drop offs 710 which can be all or some of the pending deliveries. The list of pending bag drop offs 710 can include information describing the bags that need to be dropped off such as the proposed drop off address, the passenger name, the bag description, the current bag location, and the tracking code. Each bag in the list of pending bag drop offs 710 can be associated with a selection field 720. The delivery person can check the selection field 720 for each bag in the list of pending bag drop offs 710 that he intends to presently deliver, i.e., the bags that are "out for delivery." Once the selection field 720 is checked, the delivery person submits the information by clicking a button 730. The bag(s) the delivery person has selected can be classified as current deliveries. The deliverer computing device can transmit information to the server describing the current deliveries.

Figure 8:
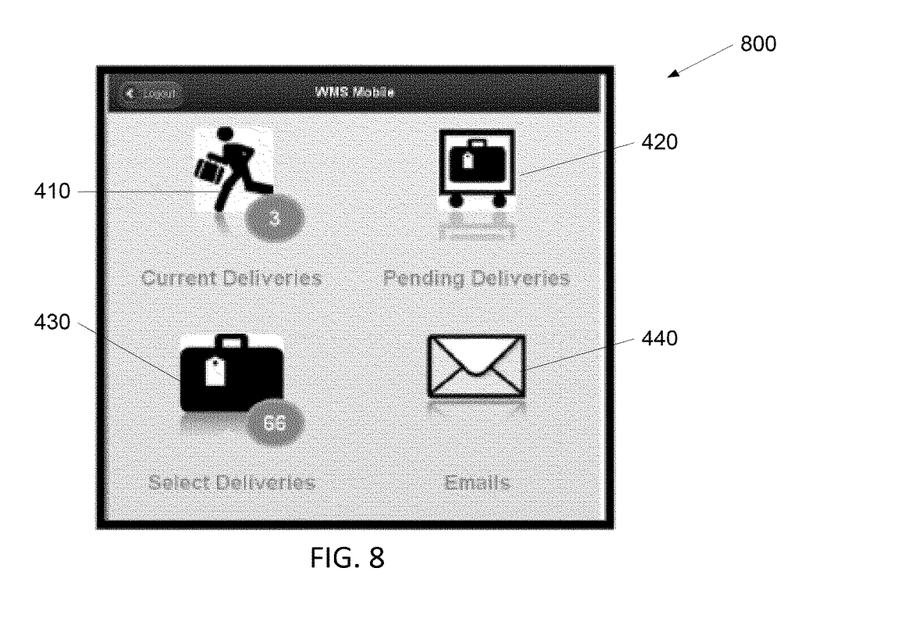
FIG. 8 is a diagram of the menu interface of FIG. 4 with current deliveries of the delivery software in accordance with an illustrative embodiment.

Referring again to FIG. 2, in an operation 230, the delivery person can proceed to a drop off location associated with a bag he has selected and picked up. The delivery person can use the deliverer computing device to determine where to take a bag and optimize his delivery route. FIG. 8 is a diagram of the menu interface of FIG. 4 with current deliveries 800 of the delivery software in accordance with an illustrative embodiment. After the delivery person has selected the bags that are "out for delivery" (operation 235 in FIG. 2) the current deliveries component 410 can indicate the number of bags out for delivery. FIG. 8 shows that there are three current deliveries.

Figure 9:
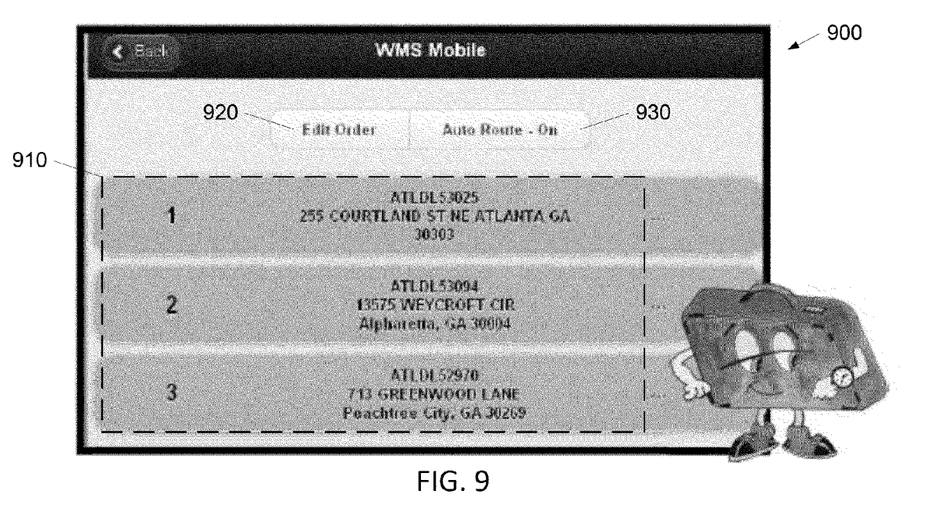
FIG. 9 is a diagram of a current deliveries interface of the delivery software in accordance with an illustrative embodiment.

FIG. 9 is a diagram of a current deliveries interface 900 of the delivery software in accordance with an illustrative embodiment. The current deliveries interface 900 can include a list of current bag drop offs 910 which can be all or some of the current deliveries. The list of current bag drop offs 910 can include information describing the bags that need to be dropped off such as the proposed drop off address, the passenger name, the bag description, the current bag location, and the tracking code. Each bag in the list of current bag drop offs 910 can be selected to provide further information. The list of current bag drop offs 910 can be ordered. For example, the bags can be ordered in terms of most efficient travel path, oldest in the queue, or a combination of both. Button 920 can be selected to edit an entry in the list of current bag drop offs 910. Button 930 can be selected to change the ordering of list of current bag drop offs 910.

Referring again to FIG. 2, in an operation 240, after the delivery person has delivered the baggage, the delivery person can indicate completion of the baggage with the deliverer computing device. For example, the delivery person can indicate that the baggage was delivered or have a passenger sign for the baggage. At the time of completion of the baggage delivery, in an operation 245, the bag information can be global position system (GPS) stamped, indicating the location of the deliverer computing device (and thus the baggage) at the time of delivery. At the time of completion of the baggage delivery, in an operation 250, the bag information can be time stamped. In an operation 255, the GPS stamp information, the time stamp information, and other bag information can be transmitted to the server. The other information can include, for example, a duration cause and an electronic signature.

Figure 10:
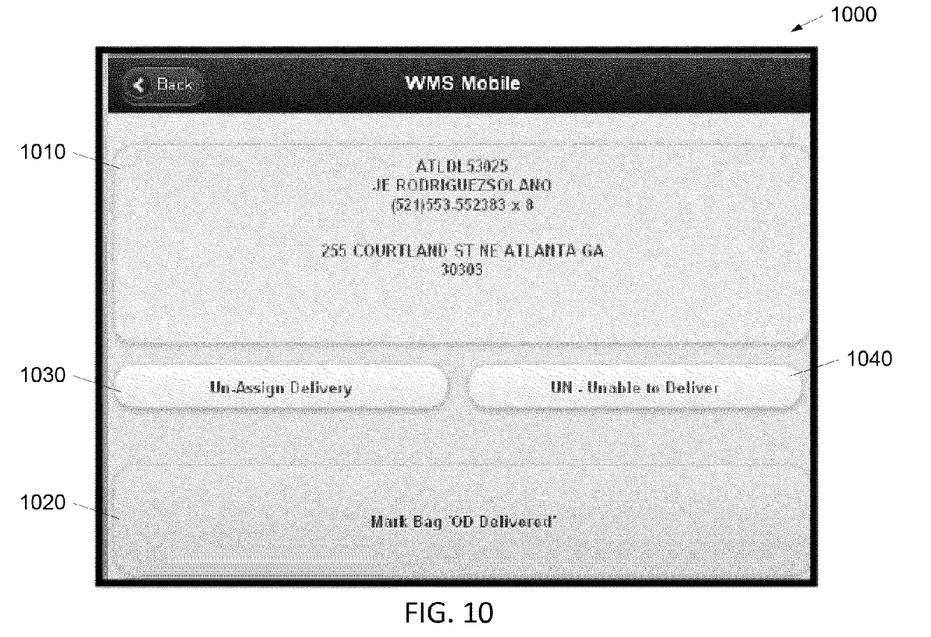
FIG. 10 is a diagram of an individual delivery interface of the delivery software in accordance with an illustrative embodiment.

FIG. 10 is a diagram of an individual delivery interface 1000 of the delivery software in accordance with an illustrative embodiment. The individual delivery interface 1000 can include an individual delivery description 1010, a delivered button 1020, an un-assign delivery button 1030, and an unable to deliver button 1040. The individual delivery description 1010 can include a display of the proposed drop off address, the passenger name, the passenger contact information, the bag description, the tracking code, and a map associated with the proposed drop off address. After the delivery person drops off the baggage, the delivery person can select the delivered button 1020 to GPS stamp the delivery, time stamp the delivery, and update the status of the delivery to "delivered." The deliverer computing device can transmit the GPS stamp, the time stamp, and the status update to the server. If the delivery person is unable to deliver the baggage, the delivery person can select the unable to deliver button 1040 to re-queue the baggage delivery for later. If the delivery person gives the baggage to another delivery person, the delivery person can select the un-assign delivery button 1030 to re-queue the baggage delivery so that the other delivery person can add the baggage to his pending deliveries.

Figure 11:
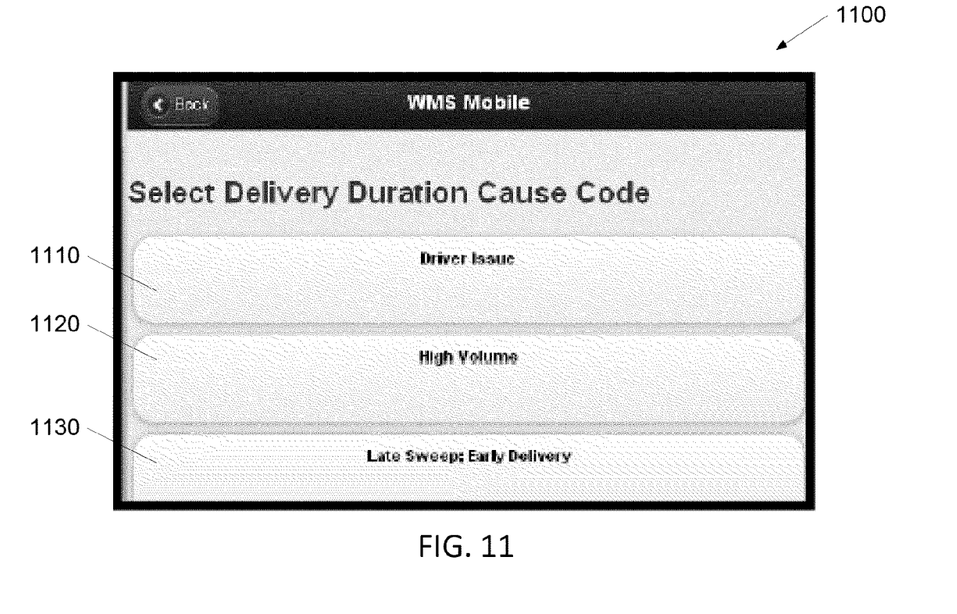
FIG. 11 is a diagram of a duration cause interface of the delivery software in accordance with an illustrative embodiment.

FIG. 11 is a diagram of a duration cause interface 1100 of the delivery software in accordance with an illustrative embodiment. If baggage is not delivered within a predetermined period, the delivery software can display the duration cause interface 1100 to prompt the delivery person to indicate the cause of the delay. If the delivery person had a vehicle problem or personal incident, he can select a driver issue button 1110. If the delivery person had to process an inordinate amount of baggage, he can select a high volume button 1120. If the delivery person picked up the baggage in the evening and delivered the next morning, he can select a late sweep/early delivery button 1130.

Figure 12:
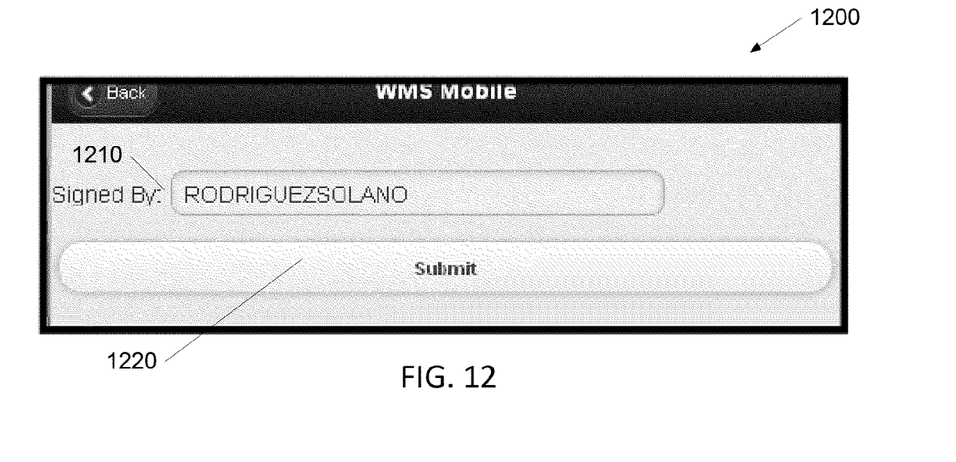
FIG. 12 is a diagram of a signature interface of the delivery software in accordance with an illustrative embodiment.

FIG. 12 is a diagram of a signature interface 1200 of the delivery software in accordance with an illustrative embodiment. The signature interface 1200 can be used to record a passenger's acceptance of the baggage delivery. The signature interface 1200 can include a signature block 1210 and a submit button 1220. The passenger can electronically sign the signature block 1210 and select the submit button 1220 to indicate acceptance of the baggage.

Figure 13:
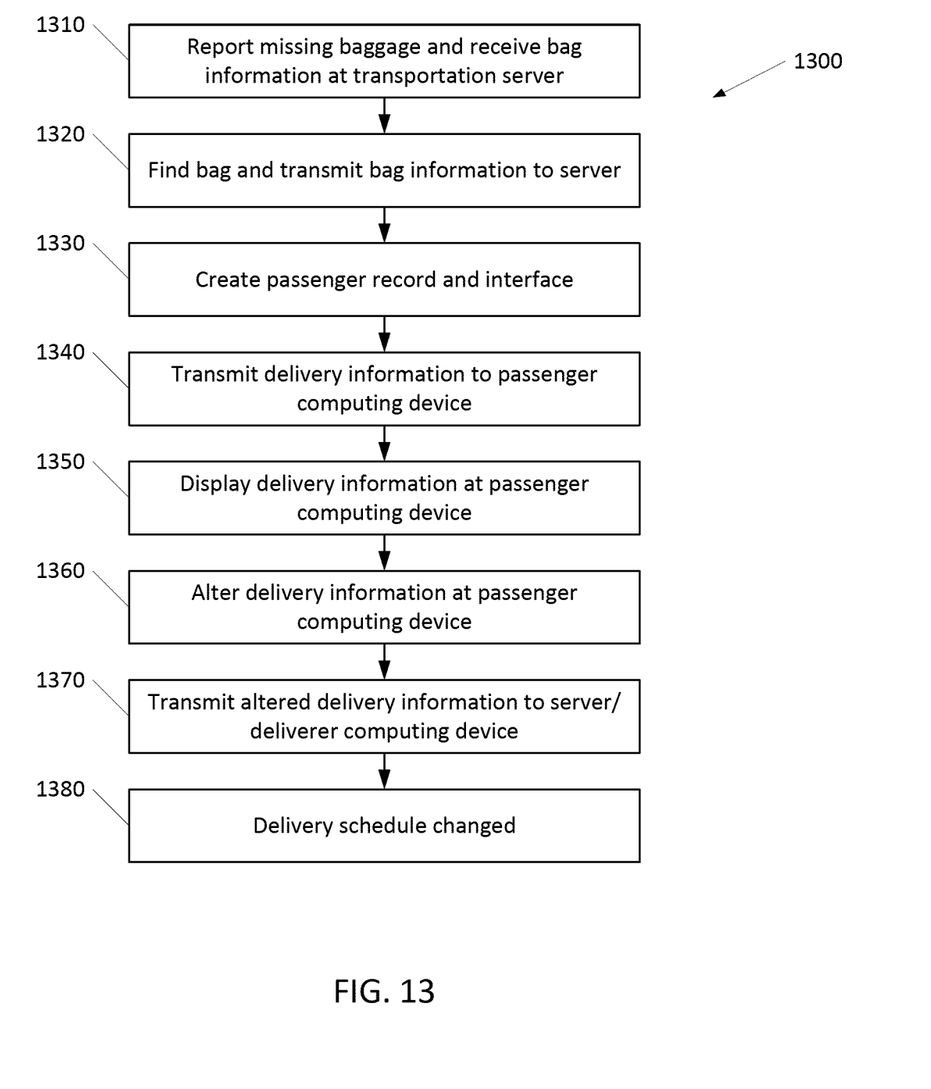
FIG. 13 is a flow diagram of a method of passenger-side baggage delivery in accordance with an illustrative embodiment is shown

Referring now to FIG. 13, a flow diagram of a method of passenger-side baggage delivery 1300 in accordance with an illustrative embodiment is shown. Additional, fewer, or different operations may be performed depending on the particular implementation. The operations for passenger-side baggage delivery 1300 can be executed, for example, in least in part by a system for mobile baggage dispatch, such as the system described above.

In an operation 1310, a passenger can report missing baggage to a common carrier, such as an airline. The passenger can provide information such as a proposed drop off address, a passenger name, passenger contact information, and a bag description. Alternatively, the common carrier can identify a bag as unclaimed. A transportation server can receive bag information such as the proposed drop off address, the passenger name, the passenger contact information, and the bag description.

In an operation 1320, after the bag is found, the transportation server can assign the bag the proposed drop off address, the passenger name, the passenger contact information, the bag description, a current bag location, delivery status, and a tracking code. The transportation server can send the bag information to a server.

In an operation 1330, the server can create a passenger record and an interface for the passenger. The interface can enable the passenger to obtain and change information regarding a prospective delivery of his missing baggage. In an operation 1340, the server can transmit delivery information to a passenger computing device. The server can also transmit delivery information to a deliverer computing device, as described above.

In an operation 1350, the passenger computing device can display the delivery information. In one embodiment, the passenger can obtain information describing the delivery person such as a picture of the delivery person, a picture of the delivery person's vehicle, an estimated time of delivery, the proposed drop off address, the delivery status, and a map showing the current location of the baggage. The interface can be, for example, a webpage or an application such as an iPhone™ app. The interface can be accessed, for example, using a passenger computing device, as described above.

In an operation 1360, the passenger can alter the delivery information. In an operation 1370, the passenger computing device can transmit the changes to the delivery information to the server. The server can then transmit the changes to the deliverer computing device. The deliverer computing device can display a notification that changes to a baggage delivery have occurred.

In an operation 1380, the server or deliverer computing device can change the delivery schedule of the delivery person. The delivery person can adapt to the changes in the delivery information. For example, if the passenger changes a proposed delivery time using the passenger computing device, the delivery person can be informed of the desired changed via the deliverer computing device.

Figure 14:
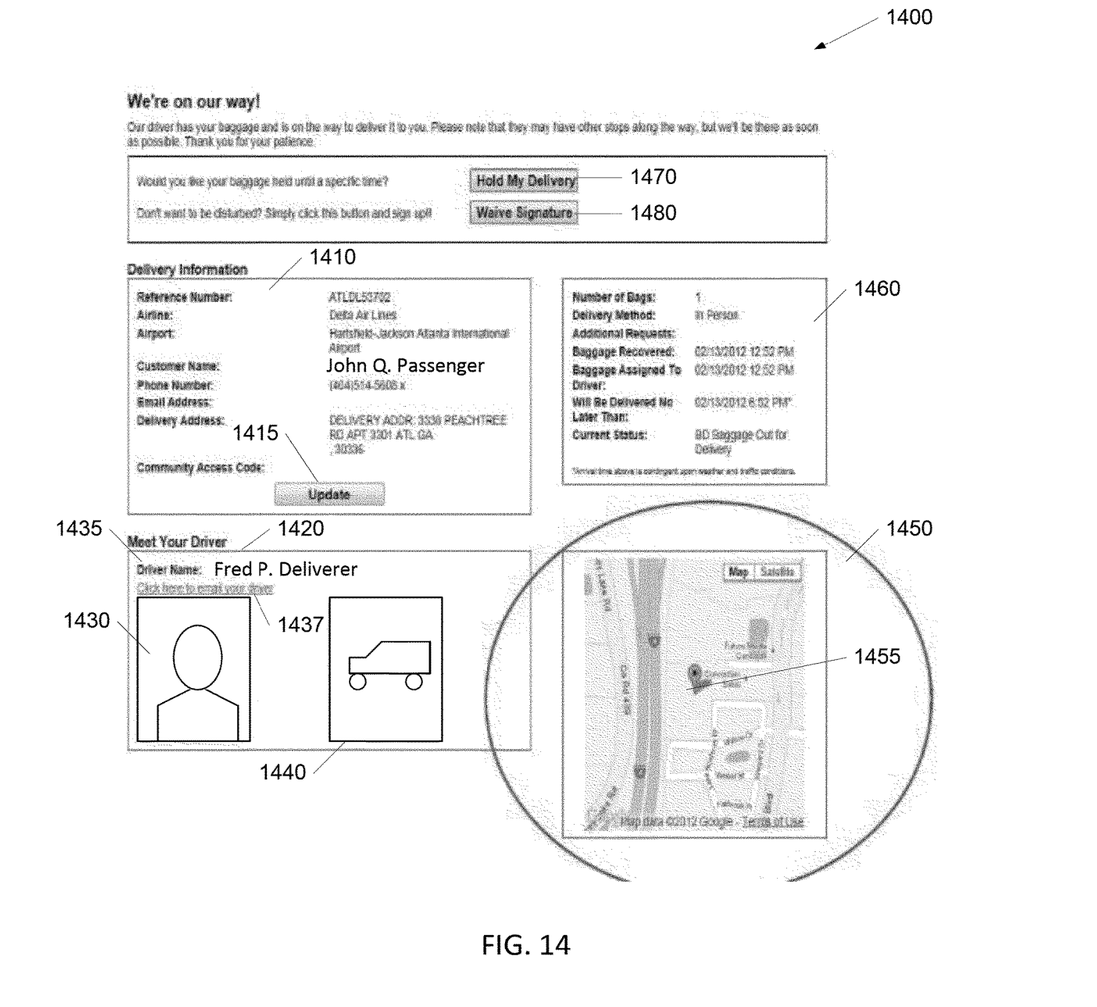
FIG. 14 is a diagram of a passenger interface of the passenger software in accordance with an illustrative embodiment.

FIG. 14 is a diagram of a passenger interface 1400 of the passenger software in accordance with an illustrative embodiment. The passenger interface 1400 can be used to display delivery information and receive selections from a passenger. The passenger interface 1400 can include delivery information 1410, driver information 1420, a baggage map 1450, baggage information 1460, a hold button 1470, and a waive signature button 1480.

The delivery information 1410 can include a reference (serial) number, airline information, airport information, a passenger (customer) name, a passenger phone number, a passenger email address, a passenger delivery address, and a community access code. The delivery information 1410 can be received from a server. The delivery information 1410 can include an update button 1415, for altering and updating the delivery information. For example, the passenger can change his passenger phone number and select the update button 1415 to transmit the change to the server.

The driver information 1420 can include a driver picture 1430, a driver name 1435, a driver email 1437, and a driver vehicle picture 1440. The driver information 1420 can be any information that can be used to identify the delivery person (driver). When a delivery person arrives at a passenger location to drop off baggage, the passenger can use the driver information 1420 to assure that the delivery person is who he represents himself to be.

The baggage map 1450 can display a current location of the passenger's baggage. Alternatively, the baggage map 1450 can display an approximate location of the passenger's baggage. A signpost 1455 can be used to mark the location of the passenger's baggage on the baggage map 1450.

The baggage information 1460 can include a number of bags in the delivery, a delivery method, additional requests, a time of baggage recovery, a time of baggage assignment to a delivery person (driver), a latest delivery time, and a current status of the baggage. The baggage information 1460 can also include information about the type of baggage, such as a size, shape, and design of the baggage. The information can include a photo of the actual baggage or of a generic baggage of the same type. The baggage photo or description can be presented on the display along with other baggage information. The passenger interface 1400 can update the baggage information 1460 as a delivery person completes other deliveries.

The passenger can select the hold button 1470 to indicate that he would like to delay delivery until a later time. For example, if the passenger will not be home until 6:00 p.m., passenger can select the hold button 1470 to delay the delivery time until after 6:00 p.m. For example, the delivery time change can be transmitted to the server, which can then relay the change to the deliverer computing device. The server or deliverer computing device can reorder the deliveries to improve efficiency given the change to the delivery time.

The passenger can select the waive signature button 1480 to indicate that the delivery person does not need to obtain a passenger signature in order to complete the delivery, i.e., the delivery person can leave the bags at the door. When the passenger selects the waive signature button 1480, a signature waiver can be transmitted to the server, which can then relay the signature waiver to the deliverer computing device.

Advantageously, a passenger can control delivery parameter, such as the delivery time, and obtain information to assure that the delivery person is who he represents himself to be.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An apparatus for dispatching baggage, comprising:
a server having a processor and a transceiver configured to transmit and receive communications to and from a passenger computing device associated with a passenger and a deliverer computing device associated with a delivery person wherein the passenger computing device includes a passenger interface to communicate with the server; and
the processor configured to:
receive, via the transceiver, after a piece of baggage has been transported to a destination, baggage information relating to the piece of baggage to be delivered to the passenger, the baggage information including a drop off address, wherein the passenger is at a location different than the destination;
associate the baggage information with the delivery person, wherein the delivery person is associated with delivery person information;
transmit, via the transceiver, a pick up bags message to the deliverer computing device associated with the delivery person; and
transmit, via the transceiver, at least a portion of the baggage information and the delivery person information to the passenger computing device associated with the passenger;
receive, via the transceiver, from the passenger computing device a selection to hold delivery of the piece of baggage using the passenger interface until a delayed delivery time wherein the passenger interface displays travel information of the passenger including at least one of an airline name and an airport name and a baggage map configured to display on the passenger computing device an approximate location or current location of the piece of baggage associated with the travel information wherein the passenger interface is updated with changes in the approximate location or the current location of the piece of baggage during transport;

relay, via the transceiver, a delivery change to the deliverer computing device responsive to the selection to hold delivery of the piece of baggage using the passenger interface; and reorder other deliveries associated with the deliverer computing device given the delivery change.

2. The apparatus of claim 1, wherein the baggage information further comprises at least one of a picture of the delivery person, a picture of a vehicle of the delivery person, a name of the delivery person, a passenger name, passenger contact information, a bag description, a current bag location, a delivery status, and a tracking code.

3. The apparatus of claim 1, wherein the processor is further configured to receive, via the transceiver, updated information entered via the user interface of the passenger computing device.

4. The apparatus of claim 3, wherein updated information comprises a selection to waive a signature using the passenger interface.

5. The apparatus of claim 3, wherein the processor is further configured to transmit, via the transceiver, the updated information to the deliverer computing device.

6. The apparatus of claim 1, wherein the processor is further configured to receive, via the transceiver, delivery information from the deliverer computing device, wherein the delivery information comprises at least one of a deliverer computing device location and a delivery time stamp.

7. A method of dispatching baggage, comprising:

receiving, through a transceiver of a server and after a piece of baggage has been transported to a destination, baggage information relating to the piece of baggage to be delivered to a passenger, the baggage information including a drop off address, wherein the passenger is at a location different than the destination;

associating, by the processor of the server, the baggage information with a delivery person, wherein the delivery person is associated with delivery person information;

transmitting, through the transceiver, a pick up bags message to a deliverer computing device associated with the delivery persona;

transmitting, through the transceiver, at least a portion of the baggage information and the delivery person information to a passenger computing device associated with the passenger;

receiving, through the transceiver, from the passenger computing device a selection to hold delivery of the piece of baggage using a passenger interface until a delayed delivery time wherein the passenger interface displays travel information of the passenger including at least one of an airline name and an airport name and a baggage map configured to display on the passenger computing device an approximate location or current location of the piece of baggage associated with the travel information wherein the passenger interface is updated with changes in the approximate location or the current location of the piece of baggage during transport;

relaying, through the transceiver, a delivery change to the deliverer computing device responsive to the selection to hold delivery of the piece of baggage using the passenger interface; and reordering, by the processor of the server, other deliveries associated with the deliverer computing device given the delivery change.

8. The method of claim 7, wherein the baggage information further comprises at least one of a picture of the delivery person, a picture of a vehicle of the delivery person, a name of the delivery person, a passenger name, passenger contact information, a bag description, a current bag location, a delivery status, and a tracking code.

9. The method of claim 7, further comprising receiving, by the transceiver, updated information entered via the passenger interface of the passenger computing device.

10. The method of claim 9, wherein updated information comprises a selection to waive a signature using the passenger interface.

11. The method of claim 9, further comprising transmitting, via the transceiver, the updated information to the deliverer computing device.

12. The method of claim 7, further comprising receiving, via the transceiver, delivery information from the deliverer computing device, wherein the delivery information comprises at least one of a deliverer computing device location and a delivery time stamp.

13. A non-transitory, tangible computer-readable storage medium having instructions stored thereon that, if executed by a server processor, cause the server processor to perform operations comprising:

transmitting and receiving communications, by the server processor via a transceiver, to and from a passenger computing device associated with a passenger and a deliverer computing device associated with a delivery person wherein the passenger computing device includes a passenger interface to communicate with a server having the server processor;

receiving baggage information, by the server processor via the transceiver, after a piece of baggage has been transported to a destination, relating the piece of baggage to be delivered to a passenger, the baggage information including a drop off address, wherein the passenger is at a location different than the destination;

associating, by the server processor, the baggage information with a delivery person, wherein the delivery person is associated with delivery person information;

transmitting, by the server processor via the transceiver, a pick up message to a deliverer computing device associated with the delivery person;

transmitting, by the server processor via the transceiver, at least a portion of the baggage information and the delivery person information to a passenger computing device associated with the passenger;

receiving, by the server processor via the transceiver, from the passenger computing device a selection to hold delivery of the piece of baggage using the passenger interface until a delayed delivery time wherein the passenger interface displays travel information of the passenger including at least one of an airline name and an airport name and a baggage map configured to display on the passenger computing device an approximate location or current location of the piece of baggage associated with the travel information wherein the passenger interface is updated with changes in the approximate location or the current location of the piece of baggage during transport;

relaying, by the server processor via the transceiver, a delivery change to the deliverer computing device responsive to the selection to hold delivery of the piece of baggage using the passenger interface; and reordering, by the server processor, other deliveries associated with the deliverer computing device given the delivery change.

14. The computer-readable storage medium of claim 13, wherein the baggage information comprises at least one of a picture of the delivery person, a picture of a vehicle of the delivery person, a name of the delivery person, a passenger name, passenger contact information, a bag description, a current bag location, a delivery status, and a tracking code.

15. The computer-readable storage medium of claim 13, further comprising receiving, by the server processor via the transceiver, updated information from the passenger computing device.

16. The computer-readable storage medium of claim 15, wherein updated information comprises a selection to waive a signature waiver by the passenger interface.

17. The computer-readable storage medium of claim 15, further comprising transmitting, by the server processor via the transceiver, the updated information to the deliverer computing device.

18. The computer-readable storage medium of claim 13, further comprising receiving, by the server processor via the transceiver, delivery information from the deliverer computing device, wherein the delivery information comprises at least one of a deliverer computing device location and a delivery time stamp.

19. The apparatus of claim 1, wherein the piece of baggage is one of a plurality of pieces of baggage to be delivered to a plurality of passengers, and wherein the processor is further configured to determine a most efficient travel path for the delivery person.

20. The apparatus of claim 1, wherein the piece of baggage is one of a plurality of pieces of baggage to be delivered to a plurality of passengers, and wherein the processor is further configured to order the plurality of pieces of baggage in a queue based on an amount of time for which each of the plurality of pieces of baggage is in the queue.

* * * * *